United States Patent
Spiess et al.

(10) Patent No.: US 10,155,287 B2
(45) Date of Patent: Dec. 18, 2018

(54) METHOD FOR REMOVING, BY MEANS OF A LASER BEAM, A BULGE DEPOSITED ON THE SURFACE OF A WORKPIECE WHEN A THROUGH HOLE IS FORMED

(71) Applicant: TRUMPF Werkzeugmaschinen GmbH + Co. KG, Ditzingen (DE)

(72) Inventors: Martin Spiess, Gerlingen (DE); Patrick Mach, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 431 days.

(21) Appl. No.: 14/966,250

(22) Filed: Dec. 11, 2015

(65) Prior Publication Data

US 2016/0096238 A1    Apr. 7, 2016

Related U.S. Application Data

(63) Continuation of application No. PCT/EP2014/001532, filed on Jun. 5, 2014.

(30) Foreign Application Priority Data

Jun. 11, 2013  (DE) .................. 10 2013 210 844

(51) Int. Cl.
*B23K 26/38*    (2014.01)
*B23K 26/382*   (2014.01)
(Continued)

(52) U.S. Cl.
CPC .......... *B23K 26/382* (2015.10); *B23K 26/048* (2013.01); *B23K 26/123* (2013.01); *B23K 26/142* (2015.10); *B23K 26/1462* (2015.10)

(58) Field of Classification Search
CPC .. B23K 26/048; B23K 26/382; B23K 26/142; B23K 26/1462; B23K 26/123; B23K 26/389; B23K 26/40
(Continued)

(56) References Cited

U.S. PATENT DOCUMENTS 5,373,135 A * 12/1994 Beyer ................. B23K 26/032
                                                219/121.62
6,204,475 B1 * 3/2001 Nakata ................. B23K 26/147
                                                219/121.84

(Continued)

FOREIGN PATENT DOCUMENTS

JP     1190670 A    4/1999
JP    11090670 A    4/1999
(Continued)

OTHER PUBLICATIONS

International Search Report for corresponding PCT Application No. PCT/EP2014/001532, dated Nov. 27, 2014, 4 pages.

*Primary Examiner* — Brian W Jennison
(74) *Attorney, Agent, or Firm* — Fish & Richardson P.C.

(57) ABSTRACT

Methods and systems are implemented for forming a through hole in a workpiece using a laser beam and a process gas, such as oxygen or nitrogen, coming from a gas nozzle. A hole is formed in the workpiece using the laser beam and a process gas emerging from a gas nozzle, such that the formed hole extends only partially through the workpiece. A bulge deposited while forming the hole partially through the workpiece is removed from the workpiece surface by directing a flow of gas through the nozzle toward the workpiece surface as the nozzle is moved with the laser beam switched off, the flow of gas being delivered to the nozzle at a higher pressure than the process gas is delivered to the nozzle during forming the hole partially through the workpiece. Then, the hole is fully pierced through the workpiece by the laser beam using the process gas.

19 Claims, 3 Drawing Sheets

(51) Int. Cl.
*B23K 26/04* (2014.01)
*B23K 26/142* (2014.01)
*B23K 26/14* (2014.01)
*B23K 26/12* (2014.01)

(58) Field of Classification Search
USPC .................................................. 219/121.7
See application file for complete search history.

(56) References Cited

U.S. PATENT DOCUMENTS

| | | | |
|---|---|---|---|
| 6,693,256 B2* | 2/2004 | Furujo | B23K 26/0665 |
| | | | 219/121.72 |
| 6,777,641 B2* | 8/2004 | Cole, III | B23K 26/04 |
| | | | 219/121.67 |
| 8,183,499 B2* | 5/2012 | Numata | B23K 26/40 |
| | | | 219/121.7 |
| 9,919,383 B2* | 3/2018 | Kano | B23K 26/38 |
| 2005/0103763 A1* | 5/2005 | Momose | B23K 26/0643 |
| | | | 219/121.69 |
| 2009/0127239 A1 | 5/2009 | Numata et al. | |
| 2011/0036461 A1* | 2/2011 | Saez | B23K 7/00 |
| | | | 148/194 |
| 2011/0210109 A1* | 9/2011 | Szelagowski | B23K 26/1476 |
| | | | 219/121.72 |

FOREIGN PATENT DOCUMENTS

| | | |
|---|---|---|
| JP | 11320171 A | 11/1999 |
| JP | 2001321975 A | 11/2001 |
| JP | 2009-190064 | 8/2009 |

\* cited by examiner

METHOD FOR REMOVING, BY MEANS OF A LASER BEAM, A BULGE DEPOSITED ON THE SURFACE OF A WORKPIECE WHEN A THROUGH HOLE IS FORMED

CROSS-REFERENCE TO RELATED APPLICATIONS

This application is a continuation of and claims priority under 35 U.S.C. § 120 to PCT Application No. PCT/EP2014/001532 filed on Jun. 5, 2014, which claimed priority to German Application No. DE 102013210844.3, filed on Jun. 11, 2013. The contents of both of these priority applications are hereby incorporated by reference in their entirety.

TECHNICAL FIELD

The invention relates to systems and methods for forming a through hole in a workpiece by a laser beam and a process gas coming from a gas nozzle.

BACKGROUND

During laser cutting, as the laser beam pierces into metal workpieces, bulges of molten and re-solidifying metal or metal oxide occur in the region around the piercing hole wherein the dimensions of the bulges are greatly increased with greater plate thicknesses. These adhesions around the piercing hole create problems mainly when internal geometries have to be cut and with small components in which the cutting contour has to run very close to the piercing location. Also a distance sensing system in the laser machining head detects the bulges as an interfering contour and controls the movement of the laser machining head away from the workpiece, which results in process-related problems. In order to avoid these problems, it is necessary to reduce or prevent bulges adhering to the workpiece.

Japanese patent publication JP11090670A discloses removing, after the completion of the piercing operation, the adhering molten metal by a circular movement around the bulge with the nozzle and blowing the adhering molten metal away with a gas jet at high pressure.

Japanese patent publication JP2009190064A discloses a piercing method wherein, in a first method step, the piercing is done using oxygen as the process gas so that a metal oxide bulge is formed on the surface of the workpiece which does not adhere as strongly as the molten metal. In a second method step, full piercing is done using nitrogen as the process gas, wherein molten metal is deposited on the metal oxide. The bulge is removed from the surface of the workpiece after the piercing operation by blowing off with a blast of gas or by having the nozzle travel across the bulge, i.e. in a scraping movement.

SUMMARY

Various embodiments of the invention disclosed herein provide systems and methods to reduce or prevent bulges adhering to the workpiece.

Accordingly, various embodiments disclosed herein specify an alternative method of piercing metal workpieces, in particular plate-shaped workpieces, with workpiece thicknesses greater than 10 mm.

In one aspect, the invention features a method for forming a through hole in a metal workpiece by a laser beam and a process gas, in particular oxygen or nitrogen, coming from a process gas nozzle, comprising the following steps:

a) forming a piercing hole in the workpiece that does not go all the way through by piercing the workpiece by means of the laser beam and the process gas;

b) removing a bulge deposited in step a) around the piercing hole on the workpiece surface by means of the process gas and/or an inert gas, whose gas pressure is higher than in step a), by movement of the process gas nozzle past the piercing hole and/or beyond the piercing hole while the laser beam is switched off; and c) full piercing the piercing hole by means of the laser beam and the process gas.

In the method according to particular embodiments of the invention, the workpiece surface is cleaned before the completion of the full piercing, and not until the full piercing operation has finished. The advantage of this is that, during full piercing, the distance between the nozzle and the workpiece surface can be reduced so that the focal point of the laser beam can be deeper in the workpiece. Furthermore, the injection of the process gas into the piercing hole is improved with a smaller distance between nozzle and workpiece, so that the full piercing is done more quickly.

In the first method step a) of the piercing method according to particular embodiments of the invention a piercing is made in the workpiece with a pulsed or continuous laser beam and with the process gas, but the piercing does not yet extend completely through the workpiece, and should extend no more than, for example, half way into the workpiece thickness. The distance between process gas nozzle and workpiece surface is selected, in this case, to be greater than in the subsequent cutting process to avoid contaminating the process gas nozzle. In the case where oxygen is used as the process gas, due to the reaction between the molten workpiece material and the oxygen, a bulge of oxidized slag, not welded to the workpiece surface, is formed around the piercing hole which is relatively easy to remove from the workpiece. Advantageously, in step a) the focal point of the laser beam is located above the workpiece surface.

In an optional intermediate step, a "post oxidation" of the slag bulge can be performed by defocused irradiation of the bulge with lower laser power than in step a). Oxygen can be used as process gas here also. In this intermediate step, the machining head is moved upwards right away from the workpiece surface to defocus the laser beam, so that the distance between process gas nozzle and workpiece surface is greater than in step a). Due to this intermediate step, the slag bulge becomes more porous since the FeO constituents in the slag are converted into Fe2O3. The bulge may also flake off the workpiece to some extent.

In the next method step b), the slag bulge is blown in particular with nitrogen (or another inert gas) as the process gas during a traverse movement of the process gas nozzle away from the workpiece. During this, the gas pressure is significantly higher than in step a), wherein the increase in pressure from step a) to step b) is done as abruptly as possible. During the traverse movement of the process gas nozzle, the laser switched off. The distance between process gas nozzle and workpiece surface is set as small as possible in order to achieve a sufficiently high gas pulse on the bulge to blow away the bulge.

In a last method step c) of the method according to particular embodiments of the invention, the piercing hole is pierced through completely with a preferably pulsed laser beam and nitrogen or oxygen as the process gas. The distance from the process gas nozzle to the workpiece surface here is preferably smaller than in method step a), so that there is good penetration of the process gas into the piercing hole. The depth and width of the piercing hole created in method step a) are selected preferably such that the molten metal generated in method step c) remains inside the piercing hole and does not reach the workpiece surface. Preferably, in step c), the focal point of the laser beam is located in the workpiece or underneath the workpiece, in particular embodiments. Where the thickness of the workpiece is thicker, the two steps a) and b) of the method according to the invention can be performed several times until full piercing is then achieved in step c). After full piercing successfully, the region of the workpiece surface around the piercing hole has no bulge in the form of slag or adhering molten metal. In this way, it is possible to cut contours subsequently with the smallest dimensions, such as narrow, long holes.

The method according to particular embodiments of the invention can be implemented on a solid-state laser cutting machine as well as on a laser cutting machine with a CO2 laser, enabling clean, pierced holes and a reliable start for the cutting process to be achieved, in particular in the machining of workpieces in aluminum or stainless steel and thicknesses of about 10 mm to about 25 mm for the workpiece.

When the focus diameter of the laser beam in method step c) is greater than in step a) or is gradually increased during the method step c), the piercing hole becomes wider at the same time as it is being pierced. The advantage of this is also that, when cutting rather than piercing is done with a wider focus diameter, the cutting process starts more reliably from the widened pierced hole since the molten metal or slag that occurs is driven well down and out of the workpiece. Increasing the focus diameter can be done, for example, by moving the lenses in the machining head. Alternatively or additionally, in the case of a fiber-guided laser beam, the path of the beam can be switched over between the core and the cladding of a double-clad fiber. The focus diameter increased continuously up to the diameter for the subsequent cutting process increases the process reliability in an advantageous manner as the piercing hole is widened.

In method step b), the process gas nozzle is moved advantageously cruciformly across the piercing hole to make sure of removing the bulge. The process gas nozzle or, to be more precise, the traversable laser machining head to which the process gas nozzle is fastened, is moved horizontally after method step a), and if applicable after the intermediate step, from the piercing hole to a first corner point. During this traverse movement or at this first corner point, the machining head is lowered and then moved horizontally at the lower distance from the workpiece past the piercing hole to a second corner point. Then the machining head is raised again and moved over the piercing hole to a third corner point. At the third corner point, the machining head is lowered again. The raising and lowering of the head can be done during the traverse movement also so that the movement describes a bow-shaped path across the piercing hole. From the third corner point, the machining head is moved parallel to the workpiece surface past the piercing hole to a fourth corner point. From there, the machining head is moved centrally over the piercing hole without being raised this time. As the process gas nozzle moves around and over the piercing hole during the blowing operation, advantageously the distance control located on the machining head is switched off.

This enables a movement to take place wherein the process gas nozzle moves past the piercing hole a small distance away from workpiece on opposite side of the piercing hole. As this movement takes place, the gas stream hits the bulge at high pressure from the side, loosening it from the workpiece surface. In addition, and with the process gas nozzle at a greater distance from the workpiece to avoid damage to the process gas nozzle by the bulge, the process gas nozzle is moved over the bulge so that the gas acts from above. The combination of all three directions of action results in a reliable bulge removal process. Any residual bulge which may remain is then moved by the process gas nozzle during the traverse of the machining head with a small nozzle gap from the surface of the plate to the center of the piercing hole.

In a further aspect, the invention also relates to a laser processing machine comprising a laser beam generator, a traversable laser machining head with a process gas nozzle, from which the laser beam together with the process gas emerges, a device for adjusting the process gas pressure and a control system which is programmed to control the movement of the laser machining head and the adjusted process gas pressure of the device according to the inventive piercing method.

Another aspect of the invention features a computer programming product which has coding means which are adapted to perform all steps of the piercing method according to the invention when the program is running on a control system of a laser processing machine.

Further advantages and advantageous embodiments of the subject matter of the invention can be derived from the description, the drawings and the claims. Also, the features described above and those described in the following can each be applied either on their own or severally in any optional combination. The embodiments illustrated and described are not to be taken as a definitive list, but instead are more of an exemplary character to illustrate the invention.

DESCRIPTION OF DRAWINGS

Like reference symbols in the various drawings indicate like elements.

DETAILED DESCRIPTION

Figure 1:
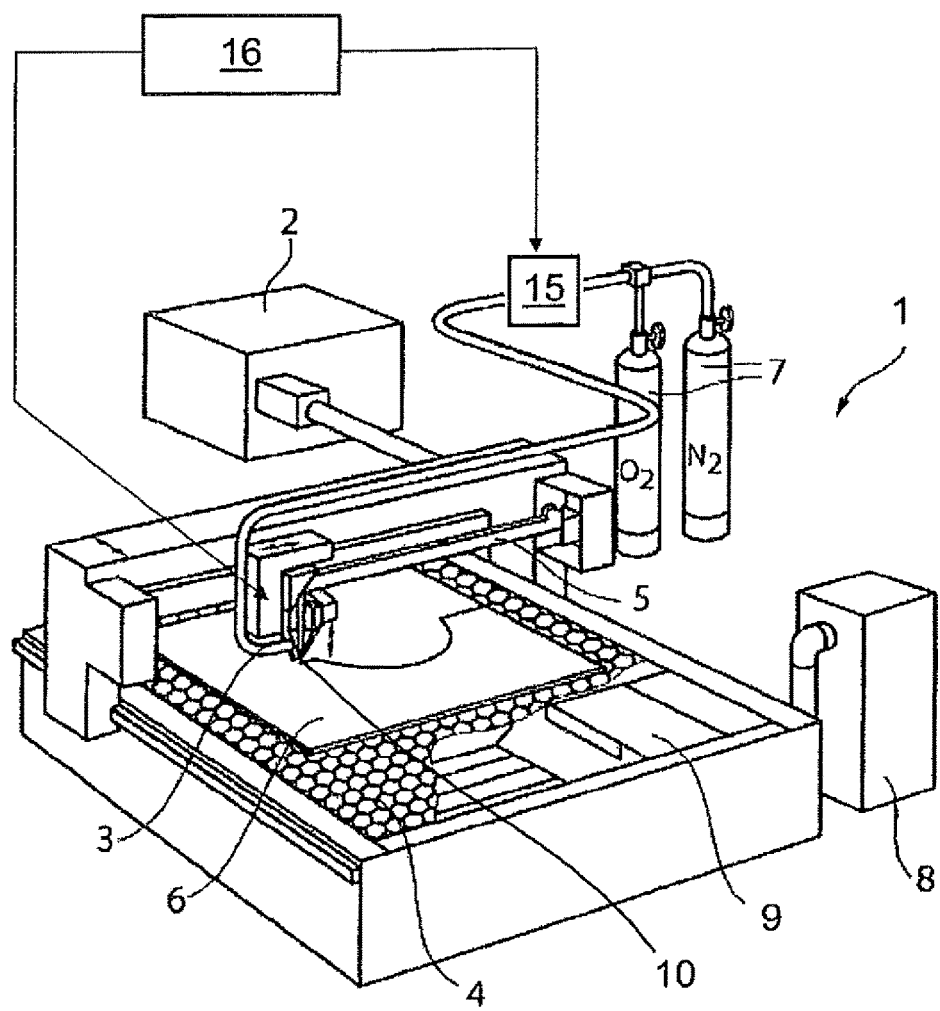
FIG. 1 a laser cutting machine suitable for performing the piercing method according to the invention.

FIG. 1 shows a perspective view of a processing machine 1 which illustrates the construction of a laser cutting machine as an embodiment of a laser processing machine. Other embodiments are, for instance, a laser welding machine or a combined punching/laser cutting machine. This processing machine 10, for example, has a CO2 laser, diode laser or solid-state laser as a laser beam generator 2, a traversable laser machining head 3 and a workpiece support 4. A laser beam 5 is generated in the laser 2, said laser beam being guided by means of an optical wave guide (not shown) or deflecting mirrors (not shown) from the laser 2 to the machining head 3. A workpiece 6 is arranged on the workpiece support 4. The laser beam 5 is directed on the workpiece 6 by means of focusing optics arranged in the machining head 3. Furthermore, the processing machine 1 is supplied with process gases 7, such as oxygen and nitrogen. Alternatively or in addition, compressed air or gases specifically for a given application can be provided. The use of the individual gases depends on the material of the workpiece 6 to be machined and on the quality requirements on the cut edges. An extraction device 8 is also present which is connected to an extraction duct 9 located under the workpiece support 4. The process gas 7 is supplied to a process gas nozzle 10 of the machining head 3 from which it emerges together with the laser beam 5.

When the workpiece 6 is cut using oxygen as the process gas, the material of the workpiece 6 is melted and largely oxidized. When inert gases are used, such as nitrogen or argon, the material is just melted. The molten particles produced, if applicable together the iron oxides, are then blown away and extracted together with the cutting gas through the extraction duct 9 by the extraction device 8.

In FIGS. 2A to 2D, the individual method steps of the method of forming a through hole in a metal workpiece 6 over 10 mm in thickness are shown.

Figure 2A:
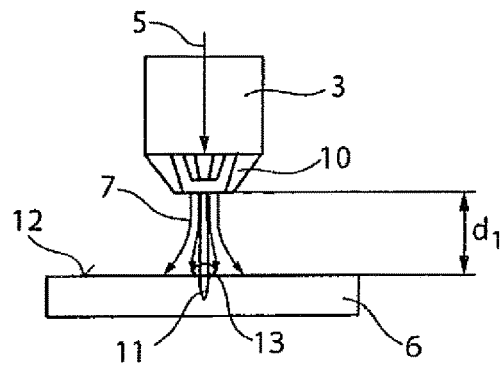
FIGS. 2A-2D are the individual method steps of the piercing method according to the invention.

In the first method step shown in FIG. 2A, a piercing hole 11 is produced in the workpiece 6 with a pulsed or continuous laser beam 5 and with oxygen as the process gas, wherein said piercing hole is intended to penetrate the material by no more than half the thickness of the workpiece, and certainly not all the way through. Advantageously, the focal point of the laser beam 5 is located above the workpiece surface 12. The distance d1 between process gas nozzle 10 and workpiece surface 12 in this case is selected greater than in the subsequent cutting process in order to avoid contamination of the process gas nozzle 10. Due to a reaction of the molten workpiece material with oxygen, an oxidized slag bulge 13, which is relatively easy to loosen from the workpiece 6, is formed around the piercing hole 11 and is not welded to the workpiece surface 12.

Figure 2B:
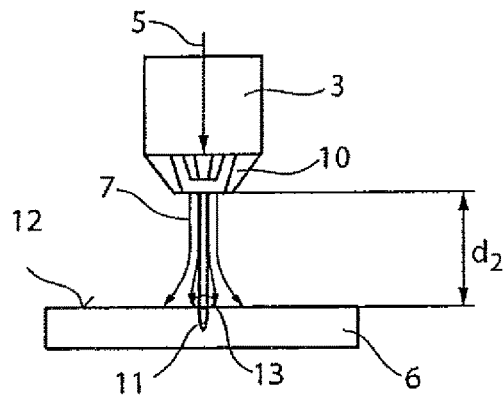

In the optional second method step shown in FIG. 2B, "post oxidation" of the slag bulge 13 is carried out by means of defocused irradiation of the bulge with the laser beam 5 with the laser power lower than in the first method step. Also, oxygen is the process gas 7 in this case. In this second method step, the machining head 3 is traversed upwards from the workpiece surface 13 to defocus the laser beam 5, so that the distance d2 between process gas nozzle 10 and workpiece surface 12 is greater than in the first method step (d2>d1). The slag bulge 13 becomes more porous due to this intermediate step, since the FeO constituents in the slag are converted into Fe2O3. The bulge 13 may also flake off the workpiece 6 to some extent.

Figure 2C:
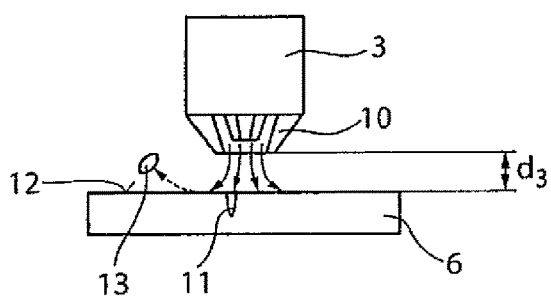

In the third method step shown in FIG. 2C, the slag bulge 13 is blown with nitrogen (or another inert gas) as the process gas 7 during a traverse movement of the process gas nozzle 10 away from the workpiece 6. During this, the gas pressure is significantly higher than in the first method step, wherein the increase in pressure from the second to the third method step is done as abruptly as possible. During the traverse movement of the process gas nozzle 10, the laser beam is switched off. The distance d3 between process gas nozzle and workpiece surface is set as small as possible (d3<d1) in order to achieve a sufficiently high gas pulse on the bulge 13 to blow away the bulge 13.

Figure 2D:
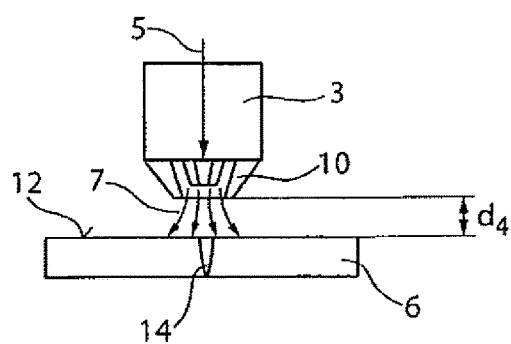

In the fourth method step shown in FIG. 2D, the piercing hole 11 is pierced completely with the pulsed laser beam 5 and nitrogen or oxygen as the process gas 7 (pressure, for example, 6 bar, and therefore higher than in the first method step) and a through hole 14 is formed. The distance d4 of the process gas nozzle 10 to the workpiece surface 12 here is smaller than in the first method step, so that the focal point of the laser beam 5 is located in the workpiece 6 or underneath the workpiece 6 and there is good penetration of the process gas 7 into the piercing hole 11. The area of the workpiece surface 12 around the through hole 14 has no bulge in the form of slag or adhering molten metal. When the focus diameter of the laser beam 5 in the fourth method step is greater than in the first or is gradually increased during the third method step, the piercing hole 11 can become wider at the same time as it is being pierced. Based on through hole 14, it is possible to cut contours subsequently with the smallest dimensions, such as narrow, long holes, in the workpiece 6.

Figure 3A:
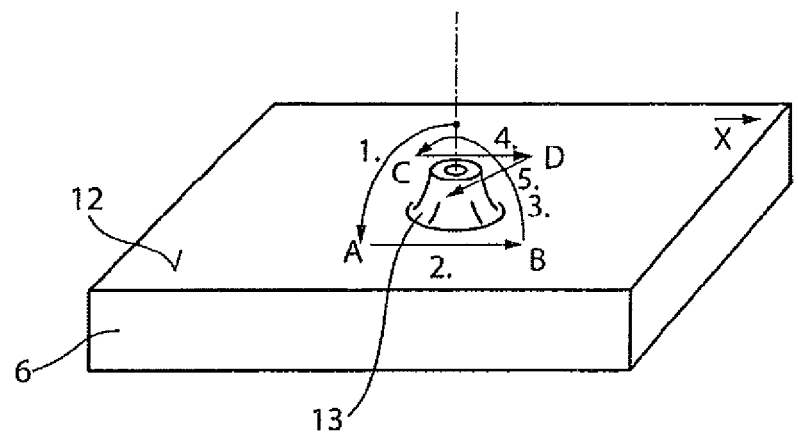
FIGS. 3A, 3B area special movement sequence of the third method step shown in FIG. 2C as a perspective view (FIG. 3A) and as a view from above (FIG. 3B) over the workpiece.
Figure 3B:
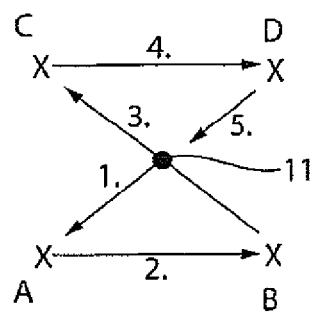

FIGS. 3A, 3B show a movement sequence according to particular embodiments of the invention of the process gas nozzle 10 over the piercing hole 11, in order to remove the bulge 13 reliably.

The process gas nozzle 10, or, respectively, the laser machining head 3, is moved horizontally from the piercing hole 11 to a first corner point A (arrow 1). During this traverse movement or at this first corner point A, the process gas nozzle 10 is lowered and then moved horizontally at the lower distance from the workpiece 6 past piercing hole 11 to a second corner point B (arrow 2). Then the process gas nozzle 10 is raised again and moved over the piercing hole 11 to a third corner point C (arrow 3), whose x-coordinate coincides with the x-coordinate of the first corner point A. At the third corner point C, the process gas nozzle 10 is lowered again. The raising and lowering of the process gas nozzle 10 can be done during the traverse movement also so that the movement describes a bow-shaped path across the piercing hole 11. From the third corner point C, the process gas nozzle 10 is moved parallel to the workpiece surface past the piercing hole 11 to a fourth corner point D (arrow 4), whose x-coordinate corresponds to the x-coordinate of the second corner point B. From there, the process gas nozzle 10 is moved centrally over the piercing hole 11 (arrow 5) without being raised this time. In this way, a cruciform movement sequence is created in which the process gas nozzle 10 moves past the piercing hole 11 on opposite sides of the piercing hole 11 and at a small distance from the workpiece 6. This movement sequence can be repeated several times.

As this movement takes place, the gas stream hits the bulge 13 at high pressure from the side, loosening it from the workpiece surface 12. In addition, and with the process gas nozzle 10 at a greater distance from the workpiece 6 to avoid damage to the process gas nozzle 10 by the bulge 13, the process gas nozzle 10 is moved over the bulge 13 so that the gas acts from above. The combination of all three directions of action results in the reliable removal of the bulge 13. Any residual bulge which may remain is then moved away by the process gas nozzle 10 during a traverse of the process gas nozzle 10 with a small nozzle distance from the plate surface 12 to the center of the piercing hole.

As shown in FIG. 1, the laser processing machine 1 also comprises a device (e.g. a pressure regulator) 15 to adjust pressure of the process gas supplied to the process gas nozzle 10 and a control system 16 which is programmed to control the traverse movement of the laser processing head 3 together with its process gas nozzle 10 as well as the process gas pressure adjusted by the device 15 in accordance with the piercing method described above.

A number of embodiments of the invention have been described. Nevertheless, it will be understood that various modifications may be made without departing from the spirit and scope of the invention. Accordingly, other embodiments are within the scope of the following claims.

What is claimed is:

1. A method of processing a workpiece, the method forming a through hole in a workpiece using a laser beam and a process gas coming from a gas nozzle, comprising:

forming a hole in the workpiece using the laser beam and the process gas emerging from the gas nozzle, such that the formed piercing hole extends only partially through the workpiece;

removing a bulge deposited on a surface of the workpiece around the hole during forming the hole partially through the workpiece, by directing a flow of gas through the nozzle toward the workpiece surface as the nozzle is moved with the laser beam switched off, the flow of gas being delivered to the nozzle at a higher pressure than the process gas is delivered to the nozzle during forming the hole partially through the workpiece; and then fully piercing the hole through the workpiece by the laser beam, using the process gas.

2. The method according to claim 1, wherein the flow of gas comprises a flow of at least one of the process gas and an inert gas.

3. The method according to claim 1, wherein forming the hole partially through the workpiece includes positioning a focal point of the laser beam above the surface of the workpiece.

4. The method according to claim 1, wherein fully piercing the hole includes positioning a focal point of the laser beam on one of in the workpiece and underneath the workpiece.

5. The method according to claim 1, wherein the gas nozzle is held closer to the workpiece surface during the fully piercing than during forming the hole partially through the workpiece.

6. The method according to claim 1, wherein the process gas is delivered to the gas nozzle at a higher pressure during fully piercing the hole through the workpiece than during forming the hole partially through the workpiece.

7. The method according to claim 1, wherein the laser beam has a greater focus diameter while fully piercing the hole through the workpiece than while forming the hole partially through the workpiece.

8. The method according to claim 1, wherein a focus diameter of the laser beam in fully piercing the hole through the workpiece is increased from a piercing diameter up to a focus diameter for cutting.

9. The method according to claim 1, wherein the flow of gas is a flow of the process gas, the method further comprising abruptly increasing a pressure of the process gas between forming the hole partially through the workpiece and removing the bulge.

10. The method according to claim 1, wherein the flow of gas is a flow of inert gas, the method further comprising abruptly increasing a pressure of the process gas to the pressure of the inert gas.

11. The method according to claim 1, wherein moving the gas nozzle across the workpiece surface comprises moving the gas nozzle cruciformly across the hole.

12. The method according to claim 1, wherein moving the gas nozzle across the workpiece surface comprises moving the gas nozzle in parallel paths at both sides of the hole past the hole.

13. The method according to claim 1, wherein the gas nozzle is moved across the hole at a greater distance from the workpiece surface than during a movement of the gas nozzle past the hole.

14. The method according to claim 1, wherein the flow of gas is a flow of the process gas, the method further decreasing a pressure of the process gas after removing a bulge deposited on the surface of the workpiece is and before fully piercing the hole through the workpiece.

15. The method according to claim 1, further comprising, before removing the bulge with the laser beam, irradiating the bulge with the laser beam at a lower power than a power of the laser beam in forming the hole partially through the workpiece.

16. The method according to claim 15, wherein the process gas includes oxygen.

17. The method according to claim 15, wherein during irradiating the bulge the laser beam is defocused with respect to while forming the hole partially through the workpiece.

18. The method according to claim 15, further comprising, after forming the hole partially through the workpiece and before irradiating the bulge, moving the gas nozzle away from the workpiece.

19. A laser processing machine comprising:

a laser beam generator;

a traversable laser machining head with a gas nozzle, from which the laser beam together with the process gas emerges; and a control system which is programmed to control the movement of the laser machining head and to adjust the pressure of the process gas to:

form a hole in the workpiece using the laser beam and a process gas emerging from a gas nozzle, such that the formed hole extends only partially through the workpiece, remove a bulge deposited on a surface of the workpiece around the hole during forming the hole partially through the workpiece, by directing a flow of gas through the nozzle toward the workpiece surface as the nozzle is moved with the laser beam switched off, the flow of gas being delivered to the nozzle at a higher pressure than the process gas is delivered to the nozzle during forming the hole partially through the workpiece; and then fully pierce the hole through the workpiece by the laser beam, using the process gas.

* * * * *